United States Patent [19]

Manzke et al.

[11] 4,198,666
[45] Apr. 15, 1980

[54] POSITIONING DEVICE FOR A WRITE/READ MAGNETIC HEAD IN A MAGNETIC-DISC DATA STORAGE DEVICE

[75] Inventors: Klaus Manzke, Westheim; Roland Brotzler, Hochdorf-Assenheim; Gerhard Berg, Sandhausen; Karl Uhl, Frankenthal, all of Fed. Rep. of Germany

[73] Assignee: BASF Aktiengesellschaft, Ludwigshafen, Fed. Rep. of Germany

[21] Appl. No.: 875,996

[22] Filed: Feb. 8, 1978

[30] Foreign Application Priority Data

Feb. 8, 1977 [DE] Fed. Rep. of Germany ....... 2705125

[51] Int. Cl.² ............................................. G11B 21/08
[52] U.S. Cl. .................................................. 360/106
[58] Field of Search ................................ 360/106, 78

[56] References Cited

U.S. PATENT DOCUMENTS

| | | | |
|---|---|---|---|
| 3,882,541 | 5/1975 | Ghose et al. | 360/106 |
| 4,040,106 | 8/1977 | Medley | 360/99 |

*Primary Examiner*—Robert S. Tupper
*Attorney, Agent, or Firm*—Keil & Witherspoon

[57] ABSTRACT

A positioning device for a write/read magnetic head in a magnetic disc data storage device comprising a motor-driven guide disc, with a spiral-shaped guide wall arranged at right angles to the plane of the guide disc, for a guide element in the form of a ball-bearing on a magnetic-head support. Due to the greatly reduced friction it is possible to achieve highly accurate positioning within an extremely brief period of time and with an extremely low power requirement. This device may be used to position the heads in magnetic disc systems for the recording and/or reproduction of analog or digital signals.

11 Claims, 3 Drawing Figures

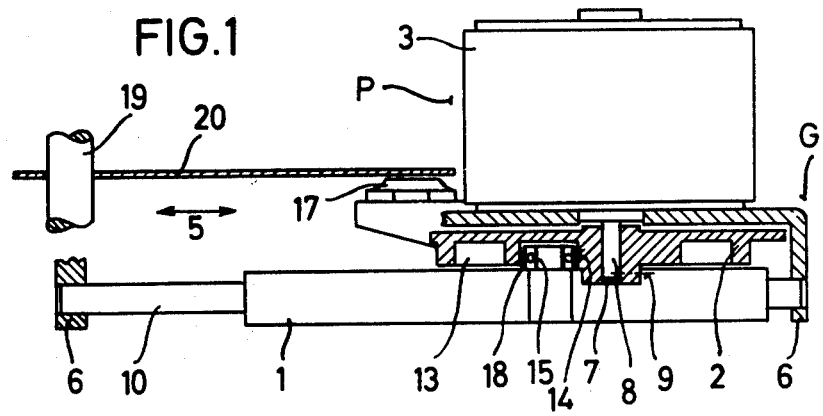
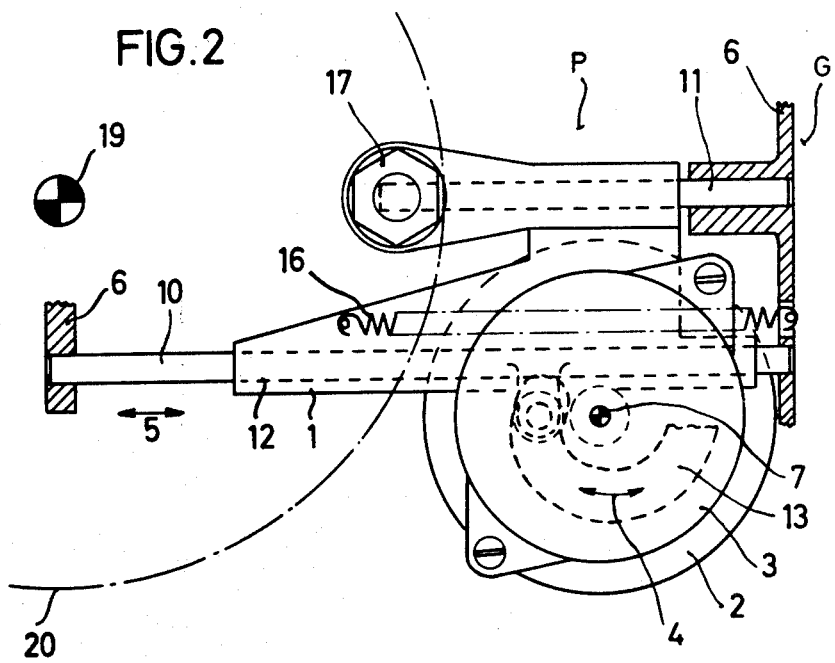

POSITIONING DEVICE FOR A WRITE/READ MAGNETIC HEAD IN A MAGNETIC-DISC DATA STORAGE DEVICE

The present invention relates to a positioning device for a write/read magnetic head in a magnetic-disc data storage device, wherein the magnetic head on a head support is guided across the magnetic disc by means of a guide element in a spiral track on a motor-driven guide disc and can be halted in any desired position on the magnetic disc by means of said guide element, which element constantly engages a guide wall of said spiral track.

A magnetic-disc data storage device has already made its appearance on the market in the form of a floppy-disc drive unit. By means of a step motor, a disc with a spiral groove of V-shaped cross-section is made to rotate, and a ball serving as guide element is pressed into the spiral groove by means of a leaf spring attached to the magnetic-head support.

In this known storage device, the step motor is arranged below the magnetic disc, so that the overall height of the assembly is considerable.

The present invention has for its object the improvement of the known device and its more economic manufacture. This object is achieved according to the invention with a positioning device for a write/read magnetic head in a magnetic-disc data storage device, the magnetic head on a head support being guided across the magnetic disc by means of a guide element in a spiral track on a motor-driven guide disc and being capable of being halted in any desired position on the magnetic disc by means of said guide element, which element constantly engages a guide wall of said spiral track, wherein there is provided a substantially vertical guide wall and a ball-bearing on the magnetic-head support, which ball-bearing is in at least predominantly rolling frictional contact with this wall.

A reliable positioning device is thus obtained which not only has a very low power requirement but also a highly accurate positioning capability. In a preferred embodiment of the invention, a guide groove is used of which at least one wall is perpendicular to the plane of the guide disc.

In a further embodiment of the invention, a guide groove of rectangular cross-section is used and the inner wall of the groove, when viewed in the radial direction of the guide disc, serves as the guide wall, the ball-bearing being urged against this wall by means of a spring. A highly precise relationship between ball-bearing and guide groove, ensuring constant contact therebetween, is thus achieved, the groove being at the same time simple to manufacture.

In a particularly advantageous design of the device, the motor is arranged above the guide disc, whereby the overall height can be reduced and also the weight of the device is shifted more towards the median plane.

Further details of the invention are disclosed in the following description of one embodiment of the positioning device illustrated in the accompanying drawings, in which FIG. 1 is a partial cross-sectional view of a magnetic-head positioning device, also showing parts of the magnetic disc and of the shaft of the drive unit in diagrammatic representation;

FIG. 2 is a plan view of the positioning device of FIG. 1; and

Figure 3:
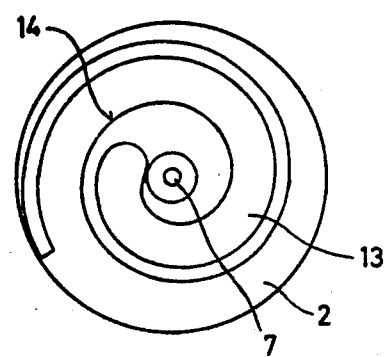
FIG. 3 is a plan view of the guide disc.

The construction and function of the said embodiment of a positioning device P according to the invention will now be explained.

The magnetic-head positioning device P comprises the following main parts: a carriage 1 which also serves as support for the magnetic head 17, a spirally grooved disc 2 and a step motor 3.

The step motor 3, the spirally grooved disc 2 and the carriage 1 are conveniently combined in a single assembly, and advantageously arranged one above the other. The step motor 3 is fastened, e.g. by means of screws, to part of the frame 6 of the housing G, illustrated in cross-section. The spirally grooved disc 2 has a central bore 7 for accommodating the shaft 8 of the step motor 3. The motor shaft 8 and the disc 2 are non-rotatably connected to one another, for example by means of a clamping screw 9.

The carriage 1 is slidably mounted on, for example, hardened steel shafts 10 and 11, so that it can move longitudinally in the directions indicated by double arrow 5. Shafts 10 and 11 are fastened to the frame 6 of the housing, as shown in FIG. 2 in particular. The shaft 10, together with the bore 12 in the carriage 1, the shaft fitting in the bore with virtually no play, constitutes the actual carriage guide, whereas the shaft 11 prevents the carriage 1 and hence the magnetic head 17 from rotating.

The lower side of the disc 2 facing the carriage 1 is provided with a spiral groove 13, which may be suitably machined, e.g. milled, therein. The spiral groove 13 preferably has a substantially constant curvature. In cross-section the groove 13 shown in FIG. 1 is of rectangular shape which is easy to manufacture. However, it is essential that the groove 13 should have at least one wall 14 parallel with the rotational axis of the disc 2. A suitable commercial ball-bearing 15 is attached to the carriage 1 in an appropriate position with respect to the groove 13. As the spirally grooved disc 2 rotates, the ball-bearing 15 moves in the spiral groove, so that, depending upon the direction of rotation (double arrow 4) of the disc 2, the carriage 1 is shifted longitudinally in one of the directions indicated by double arrow 5, i.e. forwards or backwards. The carriage 1 is drawn toward the frame 6 by means of the tension spring 16 attached to the latter. As a result, the ball-bearing 15 or, more precisely, the ball-bearing outer race 18 bears against the wall 14 of the groove 13, the outer race 18 thus being in rolling frictional contact with the wall 14. Apart from rolling friction, no other kind of friction exists, due to the advantageous design and arrangement of groove 13 and ball-bearing 15, so that the moment of retardation, produced by rolling friction, for the step motor 3 is very low indeed. The easy running of the positioning device thus achieved has a very favorable effect upon the positioning accuracy and the power requirements of the step motor 3, so that a motor of low power may be used.

Due to the direct contact between the wall 14 and the ball-bearing 15, guidance of the carriage is virtually free from backlash in both directions of rotation 4 of the disc 2. The pitch of the spiral is advantageously such that, for every step of the step motor 3, the carriage 1 is advanced by an amount corresponding to the distance between two adjacent tracks. By means of the control current supplied to the step motor 3, the carriage 1 and hence the magnetic head 17 are held in position after the desired position on the data disc 20 has been reached, against the bias of the tension spring 15. While the data disc 20, preferably a floppy disc, attached to the drive shaft 19, rotates, any desired track on the disc 20 can be reached for writing or reading data by displacement of the carriage 1 and, hence, of the magnetic head 17. FIG. 3 is a plan view of the guide disc 2. As can be seen, the spiral groove extends over an angle of more than 360°. The pitch of the spiral groove is preferably such that the carriage 1 and hence the magnetic head 17 are capable of moving over the entire distance corresponding to the track spacing and the number of tracks, in either direction indicated by double arrow 5.

The guide disc can be manufactured from any suitable dimensionally stable material, especially from plastics material, by injection molding. A suitable plastics material is polybutylene terephthalate containing finely divided glass powder as filler. Any other plastics material exhibiting similar properties may of course also be used.

In a further advantageous design of the guide disc, the guide wall is in the form of a vertical wall on a spiral member which is attached to a substantially plane disc.

We claim:

1. In a positioning device for a write/read magnetic head, carried by a head support, for a magnetic-disc data storage system, said device including a spiral track on a motor-driven guide disc and a guide element continuously engaging a wall of said spiral track, for guiding the magnetic head on said head support across the magnetic disc, said motor being a step motor so that, by means of said guide element, said magnetic head may be halted in any desired position on the magnetic disc, the improvement that the guide wall on the surface of the guide disc is substantially perpendicular to the plane of the guide disc, and that the guide element is in the form of a ball-bearing attached to the magnetic head support, the ball-bearing bearing against the guide wall and moving along said wall such that the friction between the guide wall and the ball-bearing is, at least predominantly, rolling friction.

2. In a positioning device the improvement according to claim 1, wherein the motor is arranged above the guide disc.

3. In a positioning device the improvement according to claim 1, wherein the spiral track is a spiral groove on said motor driven guide disc, said groove having at least one wall substantially perpendicular to the plane of the guide disc and serving as the guide wall for the ball-bearing.

4. In a positioning device the improvement according to claim 3, wherein the spiral groove is, over at least a part of its lengthwise extent, substantially rectangular in cross-section.

5. In a positioning device the improvement according to claim 3, wherein the spiral groove is of rectangular cross-section.

6. In a positioning device the improvement according to claim 3, wherein the spiral groove is of rectangular cross-section and the guide wall, when viewed in the radial direction of the guide disc, is the inner groove wall.

7. In a positioning device the improvement according to claim 6, wherein there is provided a spring for urging the ball-bearing against the guide wall.

8. In a positioning device the improvement according to claim 3, wherein the spiral groove in the guide disc is of rectangular cross-section and the guide element in the head support is in the form of a ball-bearing, at least one of the groove walls serving as guide wall for the ball-bearing, and a spring is provided to urge the ball-bearing against the groove wall, the friction between the guide wall and the ball-bearing being rolling friction.

9. In a positioning device the improvement according to claim 8, wherein the motor is arranged above the guide disc.

10. In a positioning device the improvement according to claim 3 wherein said spiral groove is formed in the face of said guide disc and extends over an angle of more than 360°, whereby the maximum positioning range of said guide disc is determined by a greater than 360° rotation of said disc.

11. In a positioning device the improvement according to claim 10, wherein the guide wall, when viewed in the radial direction of the guide disc, is the inner groove wall and wherein there is provided a helical spring extending parallel to said direction, for urging the ball-bearing against said wall.

* * * * *